(12) United States Patent
Hou et al.

(10) Patent No.: US 8,547,991 B2
(45) Date of Patent: Oct. 1, 2013

(54) METHOD AND APPARATUS FOR TRANSMITTING AN OVERHEAD MESSAGE

(75) Inventors: Xiaoxia Hou, Shenzhen (CN); Hui Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 6 days.

(21) Appl. No.: 13/258,885

(22) PCT Filed: May 24, 2010

(86) PCT No.: PCT/CN2010/073173
§ 371 (c)(1),
(2), (4) Date: Jun. 14, 2012

(87) PCT Pub. No.: WO2010/148878
PCT Pub. Date: Dec. 29, 2010

(65) Prior Publication Data
US 2012/0250699 A1 Oct. 4, 2012

(30) Foreign Application Priority Data
Dec. 17, 2009 (CN) .......................... 2009 1 0242862

(51) Int. Cl.
*H04B 7/216* (2006.01)
*H04W 4/00* (2009.01)

(52) U.S. Cl.
USPC .......................................... 370/441; 455/434

(58) Field of Classification Search
None
See application file for complete search history.

(56) References Cited

U.S. PATENT DOCUMENTS

| | | | | |
|---|---|---|---|---|
| 6,138,034 A * | 10/2000 | Willey | ........................... | 455/522 |
| 6,381,235 B1 | 4/2002 | Kamel et al. | | |
| 6,505,058 B1 * | 1/2003 | Willey | ........................... | 455/574 |
| 6,973,062 B1 * | 12/2005 | Han | ............................... | 370/335 |
| 8,050,692 B2 * | 11/2011 | Huang et al. | ................... | 455/458 |

FOREIGN PATENT DOCUMENTS

CN 101426175 A 5/2009

OTHER PUBLICATIONS

International Search Report in international application No. PCT/CN2010/073173, mailed on Sep. 16, 2010.
English Translation of the Written Opinion of the International Search Authority in international application No. PCT/CN2010/073173, mailed on Sep. 16, 2010.
Upper Layer 3 Signaling Standard for cdma2000 Sep. 2009.

\* cited by examiner

*Primary Examiner* — Clemence Han
(74) *Attorney, Agent, or Firm* — Oppedahl Patent Law Firm LLC

(57) ABSTRACT

The present disclosure discloses a method and an apparatus for transmitting an overload message. By detecting, after determining a latest transmit slot for an overhead message to be transmitted, whether there is an idle paging slot between a current slot and the latest transmit slot, the method transmits the overhead message to be transmitted in the idle paging slot or in the latest transmit slot, such that, when scheduling overhead messages, a paging scheduling module of the base station system not only can meet the requirement of transmitting each overhead message at least once in one overhead message period as required in CDMA2000 protocol, but also automatically schedule the next overhead message when there is an idle slot in the paging channel, thus making the best use of the idle slots of the paging channel and shortening the actual transmission period for overhead messages, without affecting the transmission of other messages in the paging channel.

8 Claims, 4 Drawing Sheets

METHOD AND APPARATUS FOR TRANSMITTING AN OVERHEAD MESSAGE

TECHNICAL FIELD

The present disclosure relates to the field of Code Division Multiple Access (CDMA) communication, and in particular, to a method and an apparatus for transmitting an overhead message in CDMA 2000 system.

BACKGROUND

According to CDMA2000 air interfaces technical specifications, it is necessary for a base station system to transmit overhead messages to a terminal within a coverage area continuously in order to notify the terminal the latest configuration information of the system. Wherein the overhead messages bear the configuration information of the base station system, when the configuration information of the base station system changes, the configuration serial number in the overhead messages will change correspondingly, to notify terminals with changes of the configuration information of the base station system.

According to CDMA2000 protocol, after a terminal receives overhead messages transmitted from the base station system in origination state, paging response state or idle state, the terminal enters into an overhead message update sub-state. Time taken by the terminal in the overhead message update sub-state and its associated paging response state, origination response state, memory idle switch-over state or other states is directly limited by the time spent for collecting all overhead messages.

Therefore, at present, it is necessary to increase the transmission frequency of the overhead messages to reduce time spent by the terminal for collecting all overhead messages. However, the paging channel resources are limited, too much and too fast transmission of overhead messages will influence transmission of other paging messages inevitably. For example, if the transmission of common paging messages and extended channel assignment messages is influenced due to too much and too fast transmission of overhead messages, the call success ratio of the base station system and the setup time of the terminal will be affected.

Generally, within an overhead message period of 1.28 s (16 slots), it is necessary for a base station to transmit an overhead message such as System Parameters Message (SPM), Access Parameters Message (APM), CDMA Channel List Message (CCLM), Extended System Parameters Message (ESPM) and Neighbor List Message (NLM) at least once. According to different services supported by a base station system, it is also necessary for the transmitted overhead messages to include some other selectable overhead messages.

At present, the process of transmitting an overhead message according to the overhead message period is as follows: for example, for transmissions of three overhead messages OH_A, OH_B and OH_C as shown in FIG. 1, in one overhead message period, first, it is necessary to determine a slot interval for transmitting respective overhead messages, evenly distribute three overhead messages OH_A, OH_B and OH_C to be transmitted in one overhead message period. When an overhead message period starts, the base station system firstly transmit the overhead message OH_A in the first slot, then obtains the slot for transmitting the overhead message OH_B by adding the current slot for transmitting the overhead message OH_A and the determined slot interval, and transmits OH_B when the transmit slot for the overhead message OH_B arrives, and meanwhile obtains the slot for transmitting the overhead message OH_C by adding the current slot for transmitting the overhead message OH_B and the determined slot interval, and finally transmits OH_C when the transmit slot for the overhead message OH_C arrives. In this way, all overhead messages to be transmitted are transmitted in one overhead message period. When the next overhead message period starts, the base station system repeats the above process.

Although the method for transmitting an overhead message described above can meet the requirement of transmitting each overhead message at least once in one overhead message period, as it is necessary to transmit each overhead message according to the slots evenly distributed in the overhead message period, it is impossible to maximally increase the transmission frequency of overhead messages without affecting the transmission of common paging messages.

SUMMARY

In view of the above, the main purpose of the present disclosure is to provide a method and an apparatus for transmitting an overhead message, to maximally increase the transmission frequency of overhead messages without affecting the transmission of common paging messages.

In order to achieve the purpose, the technical solution of the present disclosure is implemented in the following way:

the present disclosure provides a method for transmitting an overhead message, the method includes:

determining a latest transmit slot for the overhead message to be transmitted;

detecting whether there is an idle paging slot between a current slot and the determined latest transmit slot;

when there is an idle paging slot, then transmitting the overhead message to be transmitted in the idle paging slot, otherwise transmitting the overhead message to be transmitted in the determined latest transmit slot.

In the above solution, the step of determining the latest transmit slot may include: determining a slot interval between respective overhead messages required to be transmitted in an overhead message period; obtaining the latest transmit slot for the overhead message to be transmitted in the overhead message period according to the current slot and the determined slot interval In the above solution, the current slot may be an actual transmit slot of the last transmitted overhead message before the overhead message to be transmitted.

In the above solution, before determining the latest transmit slot for the overhead message to be transmitted, the method may include: when there is no overhead message transmitted before the overhead message to be transmitted, then transmitting the overhead message to be transmitted in the current slot.

In the above solution, after transmitting the overhead message to be transmitted, the method may include: when the overhead message to be transmitted is the last overhead message to be transmitted in the current overhead message period, then determining the latest transmit slot for transmitting the first overhead message to be transmitted in the next overhead message period according to the actual transmit slot for transmitting the overhead message to be transmitted; when there is an idle paging slot between the actual transmit slot of the overhead message to be transmitted and the determined latest transmit slot, then transmitting the first overhead message to be transmitted in the next overhead message period in the idle paging slot; otherwise, transmitting the first overhead message to be transmitted in the next overhead message period in the determined latest transmit slot.

The present disclosure also provides an apparatus for transmitting an overhead message, the apparatus includes: a determination unit, a detection unit and a transmission unit, wherein:

the determination unit is configured to determine the latest transmit slot for the overhead message to be transmitted;

the detection unit is configured to detect whether there is an idle paging slot between a current slot and the determined latest transmit slot, when there is an idle paging slot, initiating the transmission unit in the idle paging slot, otherwise, initiating the transmission unit in the latest transmit slot determined by the determination unit;

the transmission unit is configured to transmit the overhead message to be transmitted.

In the above solution, the determination unit may include a slot interval determination module and a latest slot determination module, wherein: the slot interval determination module is configured to determine the slot interval between respective overhead messages required to be transmitted in an overhead message period; the latest slot determination module is configured to obtain the latest transmit slot for the overhead message to be transmitted in the overhead message period according to the current slot and the slot interval determined by the slot interval determination module.

In the above solution, the detection unit may further be configured to: detecting whether there is a transmitted overhead message before the overhead message to be transmitted, when there is a transmitted overhead message, initiating the determination unit, otherwise, initiating the transmission unit in the current slot.

By detecting, after determining a latest transmit slot for an overhead message to be transmitted, whether there is an idle paging slot between a current slot and the latest transmit slot, the present disclosure transmits the overhead message to be transmitted in the idle paging slot or in the latest transmit slot, such that, when scheduling overhead messages, a paging scheduling module of the base station system can not only meet the requirement of transmitting each overhead message at least once in one overhead message period as required in CDMA2000 protocol, but also automatically schedule the next overhead message when there is an idle slot in the paging channel, thus making the best use of the idle slots of the paging channel and shortening the actual transmission period for overhead messages, without affecting the transmission of other messages in the paging channel.

DETAILED DESCRIPTION

The basic concept of the present disclosure is as follows: determining a latest transmit slot an overhead message to be transmitted; when it is determined that there is an idle paging slot between the current slot and the determined latest transmit slot, transmitting the overhead message to be transmitted in the idle paging slot.

The specific implementation of the technical solution of the present disclosure will be described in detail below with reference to drawings.

Figure 1:
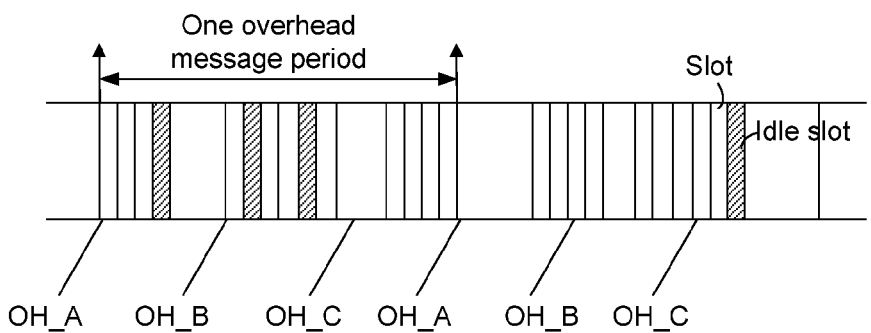
FIG. 1 shows a diagram of transmission of an overhead message according to overhead message periods in the prior art.
Figure 2:
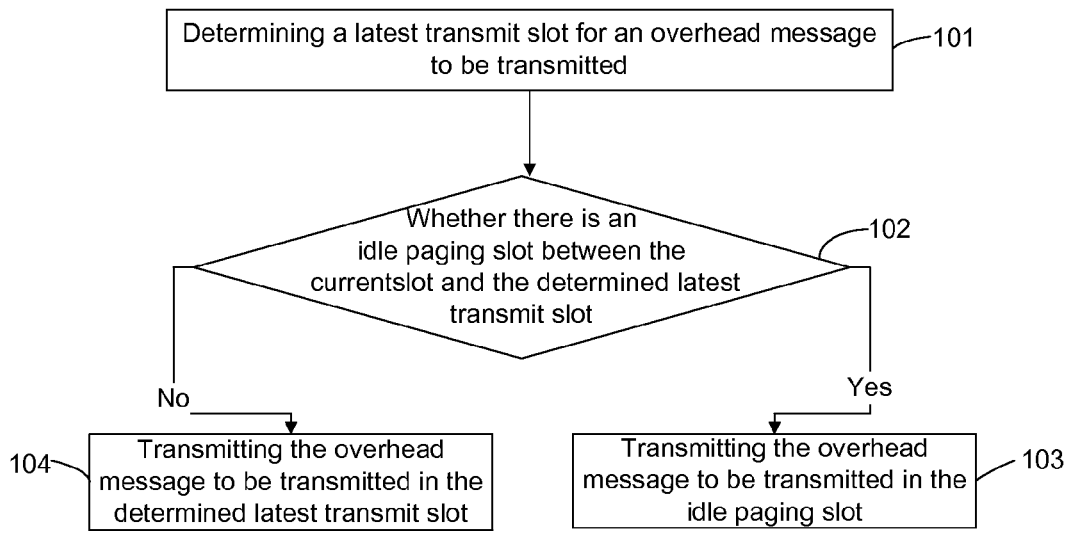
FIG. 2 shows a flow diagram of a method for transmitting an overhead message according to the present disclosure.

The method for transmitting an overhead message of the present disclosure may be implemented through a paging scheduling module of the base station system. As shown in FIG. 2, the method mainly includes:

S101: determining a latest transmit slot for an overhead message to be transmitted;

S102: determining whether there is an idle paging slot between the current slot and the determined latest transmit slot;

S103: when there is an idle paging slot, transmitting the overhead message to be transmitted in the idle paging slot, and the current processing flow is terminated;

S104: when there is not an idle paging slot, transmitting the overhead message to be transmitted in the determined latest transmit slot.

Figure 3:
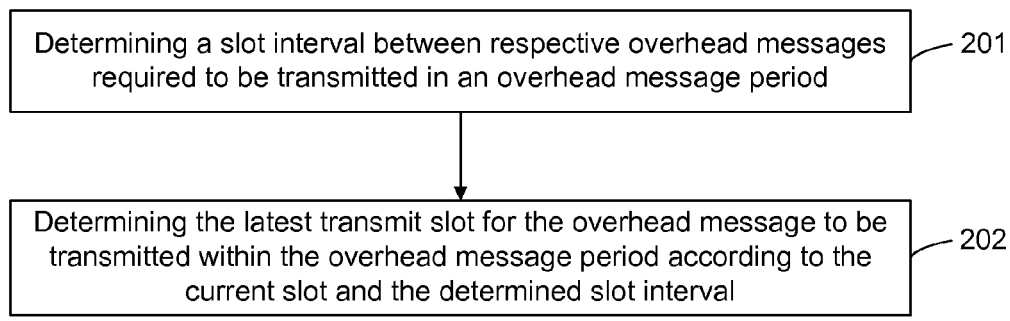
FIG. 3 shows a flow diagram for determining the latest transmit slot in FIG. 2.

Wherein, as shown in FIG. 3, determining the latest transmit slot specifically has the following steps:

S201: determining a slot interval between respective overhead messages required to be transmitted in an overhead message period;

specifically, determining the slot interval between respective overhead messages required to be transmitted may be implemented as follows: first, the paging scheduling module of the base station system calculates the paging slot length taken after accumulation of all overhead messages, and then divides the difference between the overhead message period and the length by the number of all overhead messages to be transmitted, and the obtained value is the slot interval between respective overhead messages.

S202: determining the latest transmit slot for the overhead message to be transmitted within the overhead message period according to the current slot and the is determined slot interval.

Here, the current slot may be the slot determined by the current system time or the actual transmit slot of the last transmitted overhead message before the overhead message to be transmitted.

Specifically, according to the method specified in CDMA2000, the current slot of the paging channel is obtained through the following formula (I):

$$\text{Slot} = [t/4] \bmod 2048 \qquad (1)$$

wherein t is the current base station system time in frames, 2048 is the maximum paging period specified in CDMA2000, and Slot is the current slot of the paging channel.

Here, the latest transmit slot of the overhead message may be determined by the sum of the current slot and the determined slot interval.

Wherein, in the method for transmitting an overhead message, before determining the latest transmit slot for the overhead message to be transmitted, the method further comprises:

if there is not an overhead message transmitted before the overhead message to be transmitted, that is, the overhead message is the first overhead message to be transmitted, the overhead message to be transmitted is transmitted in the current slot to start the transmission process of overhead messages. The current slot herein is obtained from the current system time through formula (1).

Wherein, after transmitting the overhead message to be transmitted, the method may further include:

if the overhead message to be transmitted is the last overhead message to be transmitted within the current overhead message period, then determining the latest transmit slot for the first overhead message to be transmitted in the next overhead message period according to the actual transmit slot of the overhead message to be transmitted;

wherein the method for determining the latest transmission period has been described in details above and will not be described again here.

If there is an idle paging slot between the actual transmit slot for the overhead message to be transmitted and the determined latest transmit slot, then transmitting the first overhead message to be transmitted in the next overhead message period in the is idle paging slot; otherwise, transmitting the first overhead message to be transmitted in the next overhead message period in the determined latest transmit slot.

Figure 4:
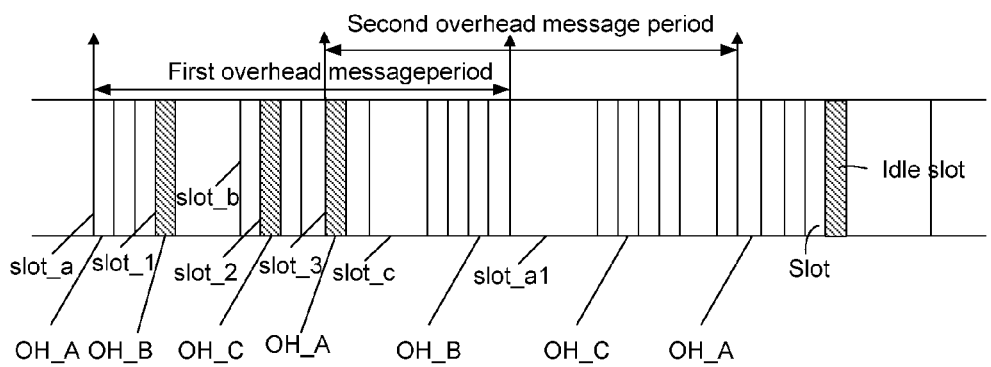
FIG. 4 shows a diagram of a case in which an overhead message is transmitted according to the method in the present disclosure.

For example, overhead messages OH_A, OH_B and OH_C are to be transmitted in turn in one overhead message period, according to the method for transmitting an overhead message in the present disclosure, with reference to FIG. 4, in the first overhead message period for starting the transmission of the overhead messages, the first overhead message OH_A is transmitted in the current slot slot_a; then, determining the latest transmit slot for the overhead message OH_B is slot_b according to the current slot slot_a and the determined slot interval between respective overhead messages, detecting that there is an idle paging slot slot_1 between the current slot slot_a and the latest transmit slot slot_b for the overhead message OH_B, then transmitting the overhead message OH_B when the slot slot_1 arrives; after transmitting the overhead message OH_B, obtaining that the latest transmit slot for the overhead message OH_C is slot_c according to the slot interval between the actual transmit slot slot_1 for the overhead message OH_B and the determined slot interval between respective overhead messages, detecting that there is an idle paging slot slot_2 between the slot slot_1 and the latest transmit slot slot_c for the overhead message OH_C, then transmitting the overhead message OH_C when the slot slot_2 arrives, in this way, all overhead messages to be transmitted in the first overhead message period have been transmitted before the overhead message period is terminated, which increases the transmission frequency of overhead messages without affecting the transmission of other messages in the paging channel.

Later, for overhead messages OH_A, OH_B and OH_C to be transmitted in the next overhead message period, transmission may be started in the slot for transmitting the overhead message OH_C in the current overhead message period. For example, for the overhead message OH_A in the second overhead message period, obtaining that the latest transmit slot for the overhead message OH_A is slot_a1 according to the slot interval between the actual transmit slot slot_2 for the overhead message OH_C and the determined slot interval between respective overhead messages, detecting that there is an idle paging slot slot_3 between the slot slot_2 and the latest transmit slot slot_a1 for the overhead message OH_A, then transmitting the overhead message OH_A of the second overhead message period in the slot slot_3. The transmission of the subsequent overhead messages is processed in the same way. In this way, under the is premise of transmitting each overhead message at least once in one overhead message period, transmitting overhead messages by using idle slots on the paging channel not only effectively utilizes the idle slots on the paging channel, but also increases the transmission frequency of overhead messages.

Another specific implementation for transmitting an overhead message in the present disclosure will be further described in detail below with reference to FIG. 5 and FIG. 6.

Figure 5:
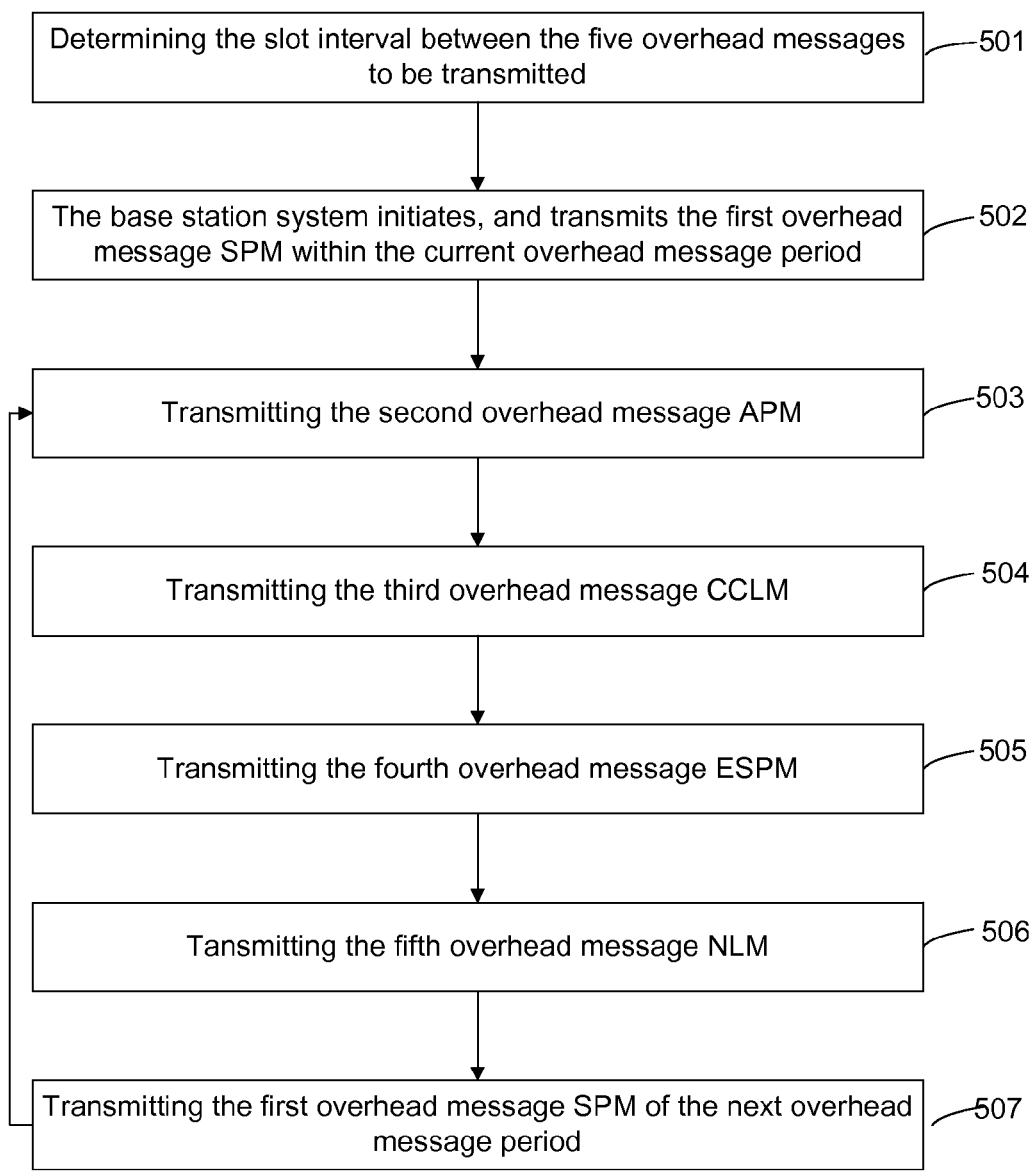
FIG. 5 shows a specific implementation flow diagram of transmitting an overhead message according to the method in the present disclosure.
Figure 6:
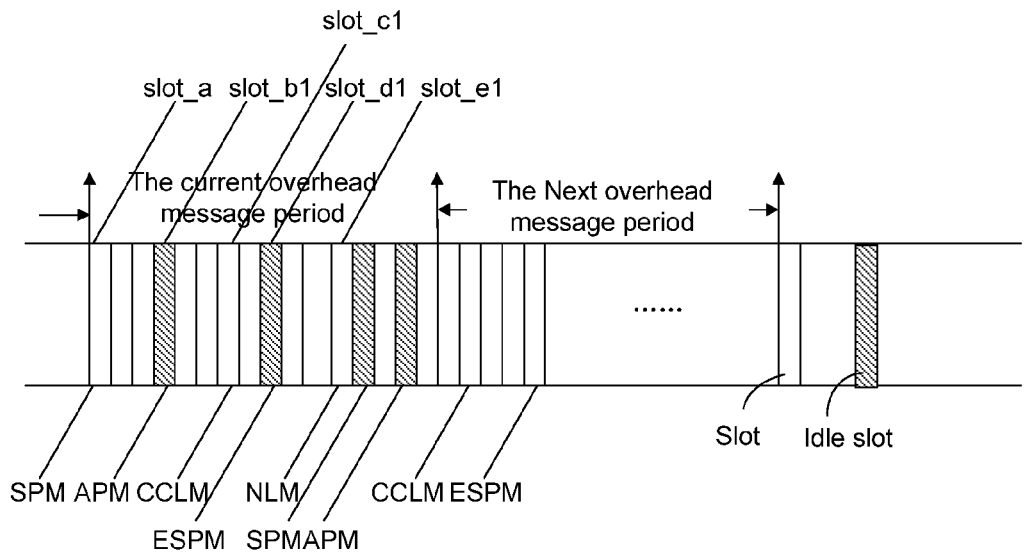
FIG. 6 shows a diagram of another case in which an overhead message is transmitted according to the method in the present disclosure.

As shown in FIG. 6, overhead messages required to be transmitted in turn by the current base station system usually comprise five overhead messages, which are SPM, APM, CCLM, ESPM and NLM, respectively, as shown in FIG. 5, the process of transmitting the five overhead messages in turn specifically comprises the following steps:

S501: first, determining the slot interval between the five overhead messages to be transmitted;

from CDMA protocol, one overhead message period is 1.28 s, i.e. 16 slots, first the slot interval between the five overhead messages is determined, such that the transmit slots of the five overhead messages are evenly distributed on one overhead message period;

wherein, the slot interval between the five overhead messages is determined specifically as follows:

$$A = 1.28 * PCHrate - SUM(SPM + APM + CCLM + ESPM + NLM);$$

$$B = A/5;$$

wherein PCHrate is the rate of the paging channel, for example 9600 bps, and 1.28 s is one overhead message period, these have been specified in CDMA2000 protocol. SUM(SPM+APM+CCLM+ESPM+NLM) indicates the total length of the paging slot occupied by the five messages on the paging channel, A represents a slot length obtained by subtracting the paging channel slot length occupied by the overhead messages from one overhead message period, B is the slot interval between two adjacent overhead messages when the five overhead messages are evenly distributed. Herein, the finally obtained slot interval B is 3 slots.

S502: the base station system initiates, and transmits the first overhead message SPM within the current overhead message period;

the order for transmitting the overhead message is as shown in FIG. 6, transmission is begins from the first overhead message SPM, the transmission of the overhead message SPM is completed in the slot slot_a when the base station system is started.

S503: transmitting the second overhead message APM;

after the slot slot_a for transmitting SPM, since the determined slot interval B is 3 slots, the latest transmit slot for APM is slot_a+3, by determining that there is not an idle paging slot between the slot slot_a and the slot slot_a+3, then APM is transmitted in the latest transmit slot slot_a+3, and the actual transmit slot slot_a+3 for APM is marked as slot_b1.

Here, although slot slot_a+3 has no other paging messages to be transmitted, i.e. slot slot_a+3 is in idle state, APM is transmitted in the slot not because the slot is in idle state, instead, APM has to be transmitted in the slot at the latest.

S504: transmitting the third overhead message CCLM;

determining that the latest transmit slot for CCLM is the slot slot_b1+3 after the slot slot_b1 for transmitting APM, detecting each slot between the slot slot_b1 and the latest slot slot_b1+3 for transmitting CCLM one by one to determine that each slot has paging messages to be transmitted, i.e. there is not an idle paging slot, then CCLM is transmitted when the slot slot_b1+3 arrives, and the actual transmit slot slot_b1+3 for CCLM is marked as slot_c1.

S505: transmitting the fourth overhead message ESPM;

first, determining that the latest transmit slot for ESPM is the slot slot_c1+3 after the slot slot_c1. Then, detecting each slot between the slot slot_c1 and the slot slot_c1+3 one by one, wherein in the slot slot_c1+2, no message is required to be transmitted, i.e. the slot slot_c1+2 is an idle paging slot, then ESPM is transmitted in slot slot_c1+2, and the actual transmit slot slot_c1+2 for ESPM is marked as slot_d1.

S506: transmitting the fifth overhead message NLM.

In accordance with the above method, it is determined that the latest transmit slot for NLM is the slot slot_d1+3 after the slot slot_d1, and it is detected that the paging channel has messages to be transmitted in each slot between the slot slot_d1 and the slot slot_d1+3, i.e. there is not an idle paging slot, then NLM is transmitted in the slot slot_d1+3, and the actual transmit slot slot_d1+3 for NLM is marked as slot_e1.

So far, all overhead messages to be transmitted in one overhead message period is have been transmitted. ESPM is transmitted one slot in advance, therefore it takes less than one overhead message period, i.e. 1.28 s (16 slots), to transmit all overhead messages to be transmitted, which increases the transmission frequency of overhead messages.

S507: transmitting the first overhead message SPM of the next overhead message period, and then turn to S503.

After the last overhead message NLM in the current overhead message period is transmitted, transmission of the five overhead messages in the next overhead message period starts. According to above method, it is determined that the first overhead message SPM in the next overhead message period requires to be transmitted in slot slot_e1+3, and there is an idle paging slot slot_e1+1 between the slot slot_e1 and the slot slot_e1+3, then the first overhead message SPM in the next overhead message period is transmitted in the slot slot_e1+1.

The overhead messages can be transmitted round by round through the above method for transmitting an overhead message, and the actual transmission period of each round of overhead messages is less than or equal to the overhead message period, such that it can be guaranteed that all overhead messages are transmitted at least once in one overhead message period, and the transmission frequency of overhead messages is increased maximally. In this way, the time taken by the terminal for collecting all overhead messages is reduced, without affecting the transmission of other messages on the paging channel.

Figure 7:
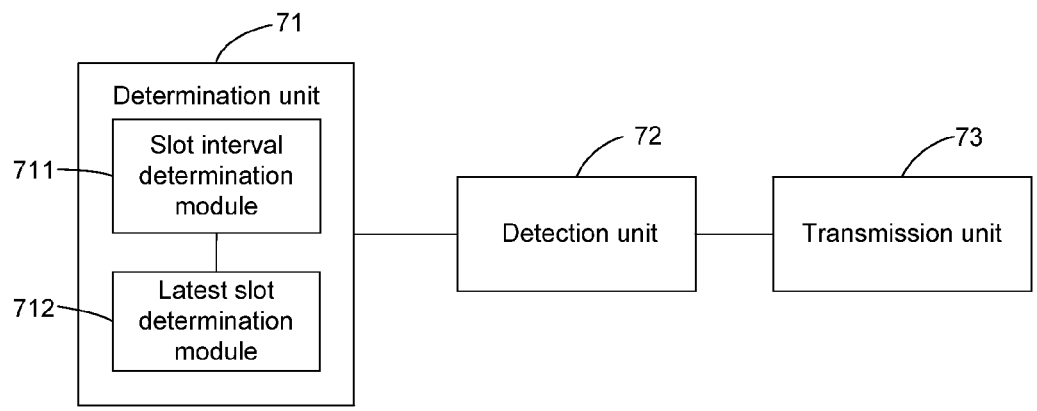
FIG. 7 shows a constitutional diagram of an apparatus for transmitting an overhead message according to the present disclosure.

As shown in FIG. 7, the apparatus for transmitting an overhead message of the present disclosure mainly comprises a determination unit 71, a detection unit 72 and a transmission unit 73, wherein:

the determination unit 71 is configured to determine a latest transmit slot for the overhead message to be transmitted;

the detection unit 72 is configured to detect whether there is an idle paging slot between the current slot and the latest transmit slot determined by the determination unit 71, if there is an idle paging slot, then initiating the transmission unit 73 in the idle paging slot, otherwise, initiating the transmission unit 73 in the latest transmit slot determined by the determination unit 71;

the transmission unit 73 is configured to transmit the overhead message to be transmitted.

Wherein, the determination unit 71 may specifically comprise a slot interval determination module 711 and a latest slot determination module 712, wherein:

the slot interval determination module 711 is configured to determine the slot interval between respective overhead messages required to be transmitted in an overhead message period;

the latest slot determination module 712 is configured to obtain the latest transmit slot for the overhead message to be transmitted within the overhead message period according to the current slot and the slot interval determined by the determination module 711.

Wherein the detection unit 72 may also be configured to: detect whether there is a transmitted overhead message before the overhead message to be transmitted, if there is a transmitted overhead message, then initiating the determination unit 71, otherwise, initiating the transmission unit 73 in the current slot.

Here, the specific process for transmitting an overhead message through the device for transmitting an overhead message has been described in details in above description and will not be described again.

The above descriptions are merely preferred embodiments of the present disclosure and are not intended to limit the protection scope of the present disclosure, any modifications, equivalent replacements or improvements done within the spirit and principle of the present disclosure should be included in the protection scope of the present disclosure.

The invention claimed is:

1. A method for transmitting an overhead message, comprising:

determining a latest transmit slot for the overhead message to be transmitted;

detecting whether there is an idle paging slot between a current slot and the determined latest transmit slot;

when there is an idle paging slot, then transmitting the overhead message to be transmitted in the idle paging slot, otherwise transmitting the overhead message to be transmitted in the determined latest transmit slot.

2. The method for transmitting an overhead message according to claim 1, wherein the step of determining the latest transmit slot comprises:

determining a slot interval between respective overhead messages required to be transmitted in an overhead message period;

obtaining the latest transmit slot for the overhead message to be transmitted in the overhead message period according to the current slot and the determined slot interval.

3. The method for transmitting an overhead message according to claim 1, wherein the current slot is an actual transmit slot of the last transmitted overhead message before the overhead message to be transmitted.

4. The method for transmitting an overhead message according to claim 1, further comprising: before determining the latest transmit slot for the overhead message to be transmitted, when there is no overhead message transmitted before the overhead message to be transmitted, then transmitting the overhead message to be transmitted in the current slot.

5. The method for transmitting an overhead message according to claim 1, further comprising: after transmitting the overhead message to be transmitted, when the overhead message to be transmitted is the last overhead message to be transmitted in the current overhead message period, then determining the latest transmit slot for transmitting the first overhead message to be transmitted in the next overhead message period according to the actual transmit slot for the overhead message to be transmitted;

when there is an idle paging slot between the actual transmit slot of the overhead message to be transmitted and the determined latest transmit slot, then transmitting the first overhead message to be transmitted in the next overhead message period in the idle paging slot;

otherwise, transmitting the first overhead message to be transmitted in the next overhead message period in the determined latest transmit slot.

6. An apparatus for transmitting an overhead message, comprising: a determination unit, a detection unit and a transmission unit, wherein:

the determination unit is configured to determine a latest transmit slot for the overhead message to be transmitted;

the detection unit is configured to detect whether there is an idle paging slot between a current slot and the determined latest transmit slot, when there is an idle paging slot, initiating the transmission unit in the idle paging slot, otherwise, initiating the transmission unit in the latest transmit slot determined by the determination unit;

the transmission unit is configured to transmit the overhead message to be transmitted.

7. The apparatus for transmitting an overhead message according to claim 6, is wherein the determination unit comprises a slot interval determination module and a latest slot determination module, wherein:

the slot interval determination module is configured to determine the slot interval between respective overhead messages required to be transmitted in an overhead message period;

the latest slot determination module is configured to obtain the latest transmit slot for the overhead message to be transmitted in the overhead message period according to the current slot and the slot interval determined by the slot interval determination module.

8. The apparatus for transmitting an overhead message according to claim 6, wherein the detection unit is further configured to:

detecting whether there is a transmitted overhead message before the overhead message to be transmitted, when there is a transmitted overhead message, initiating the determination unit, otherwise, initiating the transmission unit in the current slot.

* * * * *